US007722100B2

(12) United States Patent
Suciu et al.

(10) Patent No.: US 7,722,100 B2
(45) Date of Patent: May 25, 2010

(54) SIGN HOLDING EXTRUSION-ATTACHMENT ARRANGEMENT

(75) Inventors: Rebecca C. Suciu, Lynn, MA (US); David E. Pitcher, Cambridge, MA (US); Thomas P. Burrous, Haverhill, MA (US); Alan L. Stenfors, Scituate, MA (US); Sidney Rose, Marblehead, MA (US)

(73) Assignee: Rose Displays, Ltd., Salem, MA (US)

( * ) Notice: Subject to any disclaimer, the term of this patent is extended or adjusted under 35 U.S.C. 154(b) by 439 days.

(21) Appl. No.: 11/710,782

(22) Filed: Feb. 26, 2007

(65) Prior Publication Data

US 2008/0203748 A1 Aug. 28, 2008

(51) Int. Cl.
*B25J 1/04* (2006.01)

(52) U.S. Cl. ...................................... 294/19.1; 248/544

(58) Field of Classification Search ................ 294/19.1, 294/24, 85; 248/544
See application file for complete search history.

(56) References Cited

U.S. PATENT DOCUMENTS

| | | | | |
|---|---|---|---|---|
| 579,675 | A * | 3/1897 | Glover | 294/24 |
| 606,710 | A * | 7/1898 | Fosgate | 294/24 |
| 3,115,657 | A * | 12/1963 | Kikas | 15/150 |
| 3,863,289 | A * | 2/1975 | Whittaker | 15/228 |
| 4,181,295 | A * | 1/1980 | Duffy | 269/3 |
| 5,188,332 | A * | 2/1993 | Callas | 248/544 |
| 5,267,764 | A * | 12/1993 | Hoffman et al. | 294/19.1 |
| 5,794,906 | A * | 8/1998 | Harris et al. | 248/317 |
| 6,048,010 | A * | 4/2000 | Stocker | 294/19.1 |

* cited by examiner

*Primary Examiner*—Dean J Kramer
(74) *Attorney, Agent, or Firm*—Don Halgren

(57) ABSTRACT

A sign hanging tool assembly for the attachment of a sign holding extrusion to a ceiling rail in a ceiling. The assembly comprises an extrusion tool mounted on an end of an elongated pole. The extrusion tool comprises a T-frame and a bias arm shaft. The T frame has a rear flange for engagement with a slot on the sign holding extrusion. The bias arm shaft is spaced apart and parallel to the rear flange for locating and engaging the sign holding extrusion therebetween.

5 Claims, 8 Drawing Sheets

SIGN HOLDING EXTRUSION-ATTACHMENT ARRANGEMENT

BACKGROUND OF THE INVENTION

1. Field of the Invention

This invention relates to an apparatus for attaching and removing elongated sign-holding extrusions from magnetic attachment to overhead ceiling supports such as inverted "T" shaped ceiling rails which are utilized primarily in a commercial establishment.

2. Prior Art

Attaching and removing signs in a commercial establishment such as a retail store or the like is an ongoing process. It may often be done by unsophisticated personnel working in areas which are not necessarily easily accessible. It is intended that any such tool or apparatus permit the attachment and removal in the briefest of time and which will accommodate a variety of ceiling rail suspension arrangements.

The present invention is an improvement over our existing sign attaching and removal apparatus, shown in our earlier U.S. Pat. No. 5,267,764, which is incorporated herein by reference by its entirety.

It is an object of the present invention to overcome the disadvantages of the prior art.

It is a further object of the present invention, to provide a sign support apparatus which is adaptable to a variety of "T" rail configurations.

It is yet a further object of the present invention, to provide a tool arrangement for attaching and removing a sign support apparatus which provides leverage, when such apparatus is utilized with particularly strong magnets.

BRIEF SUMMARY OF THE INVENTION

The present invention relates to a sign holding attachment tool for attaching and removing an elongated sign supporting extrusion from an inverted T-rail which is part of a ceiling tile-support arrangement. The sign holding extrusion attachment tool "assembly" may comprise an elongated pole having an extrusion tool on its uppermost end. Note that the extrusion tool may be utilized by itself, without its being attached on the end of a pole.

The extrusion tool comprises a cylindrical shaft having a first end which may mate as an assembly, with an opening at the upper or distal end of the elongated pole. The shaft has a T-frame transversely attached thereacross. The extrusion tool shaft has a tip end extending beyond the edge of the T-frame. The T-frame has a first end and a second end. The T-frame has an elongated rear flange which is parallel to the shaft of the T-frame, and connected to the shaft by an elongated bridge member.

The elongated rear flange has a first side, which faces the shaft or bias arm of the extrusion tool. An elongated boss is unitary with and situated on the first face of the elongated rear flange. The elongated boss extends from the first end of the elongated rear flange to the second end of the elongated rear flange. The elongated boss has an elongated angled first face which tapers away from the first side of the flange, towards a thicker dimension in the direction of the elongated bridge. The elongated boss at each end thereof, has a generally triangularly shaped tapered first face and a second generally triangularly shaped tapered second face which each of which taper towards a point at their respective ends of the elongated rear flange. The elongated boss has a lower lip extending from the outwardmost point defined by the first and second triangles and constitutes a lowermost side of the elongated boss.

The lower lip or lowermost side of the elongated boss is thus spaced-apart from and generally parallel to the elongated bridge connecting the elongated rear flange to the tool shaft extending perpendicular therepast.

Such a sign holding extrusion attachment tool assembly or extrusion tool by itself, is to be utilized to raise and attach (and remove) a sign supporting extrusion to an inverted elongated T-rail ceiling tile support.

A sign supporting extrusion itself, has an elongated upper channel therein in which one or more magnets are adjustably arranged. The sign supporting extrusion has a lowermost edge portion with a central channel extending therethrough. The central channel is defined by a pair of opposed J-shaped flanges which between them define a lower gap which opens to the central channel.

To hoist and attach a sign supporting extrusion onto an inverted T-rail in a ceiling structure, the elongated rear flange may be pushed into the gap between the opposed J-shaped flanges along the bottom edge of the elongated extrusion. The elongated lowermost face on the elongated boss is in abuttable engagement with one of the opposed J-shaped flanges. The shaft (bias arm) on the extrusion tool has an extrusion engaging face which is flat, and parallel to the elongated rear flange. A portion of the elongated sign supporting extrusion is supportively disposed between the elongated rear flange and the flat face of the shaft on the extrusion tool. That extrusion tool may preferably be pushed orthogonally onto supportive engagement of the sign supporting extrusion when it is desired to lift that extrusion and its associated magnets up into magnetic contact with the inverted T-rail.

The extrusion tool may also, in one embodiment, be slid on/off of the end at one opening thereof when it is desired to attach/remove that extension tool with respect to an elongated sign holding extrusion.

When it comes time to remove the extrusion tool from an "in-place" elongated extrusion and any associated signs supported therewith, the extrusion tool (and the elongated pole) having already raised the elevation of that sign supporting extrusion to the ceiling support, the first or second end of the elongated rear flange which was initially pushed into insertion through the gap between the opposed J-shaped flanges thereof, is pivoted. That is, the extrusion tool (and elongated pole) is pivoted in a plane which is parallel to the elongated rear flange of the extrusion tool. The angled triangularly shaped second face then wedgingly permits the elongated boss to be pulled outwardly by camming action of that second triangle with the boss, thus expanding the gap between the opposed J-shaped flanges, permitting that boss and that elongated rear flange to pop out from between that aforementioned gap between the J-shaped flanges. Each distal edge of those opposed J-shaped flanges are now removed from pinching of the elongated rear flange at its narrow portion between the boss and the elongated bridge.

To fully remove that elongated sign supporting extrusion (and any sign) from an overhead ceiling support, the (elongated pole) extrusion tool (thereattached), is orthogonally pushably inserted into engagement with the channel in the sign holding extrusion and is (are) pivoted in a plane perpendicular to the plane in which the elongated rear flange lies. The flat face on the bias arm of the shaft of the tool first helps to locate the tool in proper orientation with the gap on the elongated extrusion, and then permits a "lever action" between the elongated boss and the face of the shaft of the bias arm against the side of the elongated support extrusion so as to pivot the magnets arranged in the upper channel of the elongated sign supporting extrusion away from the lower flange on the inverted T-rail. That sign supporting extrusion and sign thereattached may thus be removed and changed and re-applied as necessity requires.

Thus there has been shown a unique system for attaching and removing a sign holding extrusion from an inverted T-rail ceiling support arrangement. Such an extrusion tool is preferred, particularly when strong magnets are utilized which may be dimensionally narrow but magnetically strong so as to be utilized on any variety of T-rails or magnetic attachments and alignments therewith. The tool also permits attachment and removal of a sign from the safety of the floor, without the inherent risks and dangers of ascending a ladder in order to manually change a sign.

The invention thus comprises a sign hanging tool assembly for the attachment of a sign holding extrusion to a ceiling support rail in a ceiling, comprising: an extrusion tool which may be mounted on an end of an elongated pole, the extrusion tool comprising a T-frame and a bias arm shaft. The T frame has a rear flange for engagement with a slot on the sign holding extrusion. The bias arm shaft is spaced apart and parallel to the rear flange for locating and engaging the sign holding extrusion therebetween. The rear flange has an elongated boss thereon to permit wedging exit of the extrusion tool from the sign holding extrusion. The bias arm shaft has a flat face thereon which is parallel to the rear flange. The elongated boss preferably has an angled face sloping towards to the bias arm shaft. The elongated boss preferably has a tapered surface at each end thereof The rear flange is attached to the bias arm shaft by an elongated bridge member connectively spaced therebetween. The tapered surface at each end of the elongated boss comprises a generally triangularly shaped first face and a generally triangularly shaped second face. The flat face on the bias arm shaft and the rear flange are spaced apart so as to snugly support a sign holding extrusion therebetween.

The invention also includes a method of effecting securement of a sign holding extrusion relative to a ceiling frame support member, comprising one or more of the following steps: moving an elongated rear flange of an extrusion tool pressably into a channel of the sign holding extrusion; snappingly securing the rear flange into the sign holding extrusion; lifting the sign holding extrusion into magnetic seurement to a ceiling frame support member, and pivoting the extrusion tool (and the elongated pole) so as to effect dis-engagement of the extrusion tool from the sign holding extrusion. The method may include pivoting the extrusion tool and the elongated pole in a plane parallel to the sign holding extrusion to effect dis-engagement and removal of the rear flange from the sign holding extrusion. The sign holding extrusion may be attachable to said ceiling support member preferably by a magnetic arrangement. The method may include one or more of the following steps: arranging the shaft spaced apart from the rear flange of the extrusion tool to locate the gap in the elongated extrusion, thus properly locating the tapered elongated boss; pushing the tapered elongated boss orthogonally into a gap on the sign holding extrusion to permit the extrusion tool to securely engage the sign holding extrusion; tapering at least one end of the elongated boss to facilitate removal of the rear flange from the pinch gap on the sign holding extrusion; and pivoting the elongated pole in a plane transverse to the sign holding extrusion to effect dis-engagement of the sign holding extrusion from the ceiling support member.

BRIEF DESCRIPTION OF THE DRAWINGS

The objects and advantages of the present invention will become more apparent, when viewed in conjunction with the following drawings in which.

DETAILED DESCRIPTION OF THE INVENTION

Figure 1:
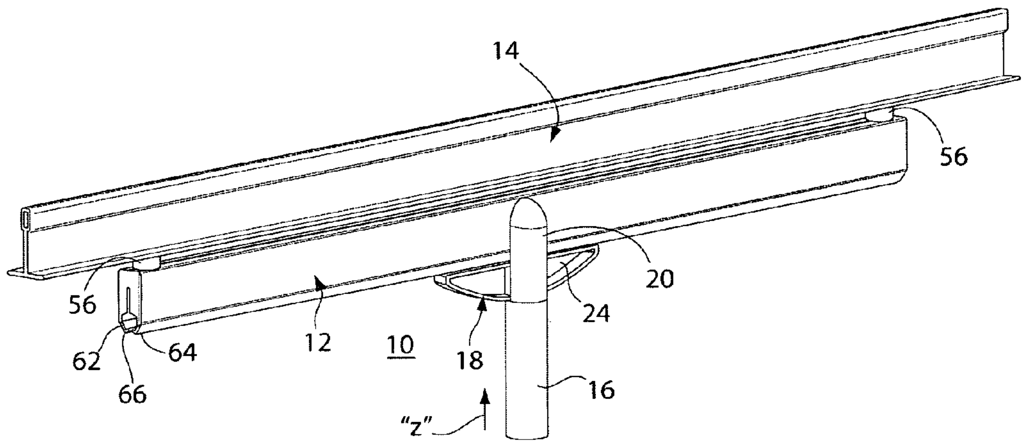
FIG. 1 is a perspective view of an elongated sign supporting extrusion magnetically attached to an inverted t-rail ceiling support arrangement with an extrusion tool supported thereagainst, held in place by the upper end of an elongated pole.

Referring now to the drawings in detail, and particularly to FIG. 1, there is shown the present invention which comprises a sign holding attachment tool assembly 10 for attaching and removing an elongated sign supporting extrusion 12 from a ceiling support, such as for example, a inverted T-rail 14, which is part of a ceiling tile-support arrangement. The sign holding extrusion attachment tool assembly 10 comprises an elongated pole 16 having an extrusion tool 18 on its uppermost end, as shown in FIGS. 1, 2, 3 and 4.

Figure 2:
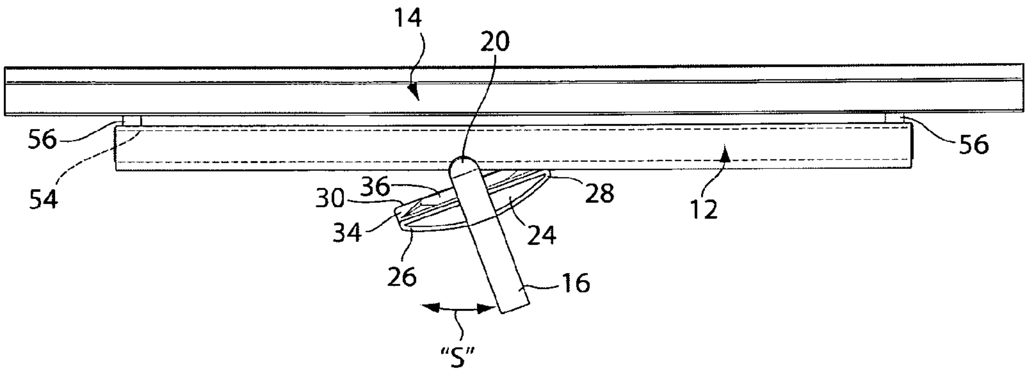
FIG. 2 is a side elevational view of the elongated t-rail, the elongated sign supporting extrusion and the extrusion tool being removed from that sign supporting extrusion.
Figure 3:
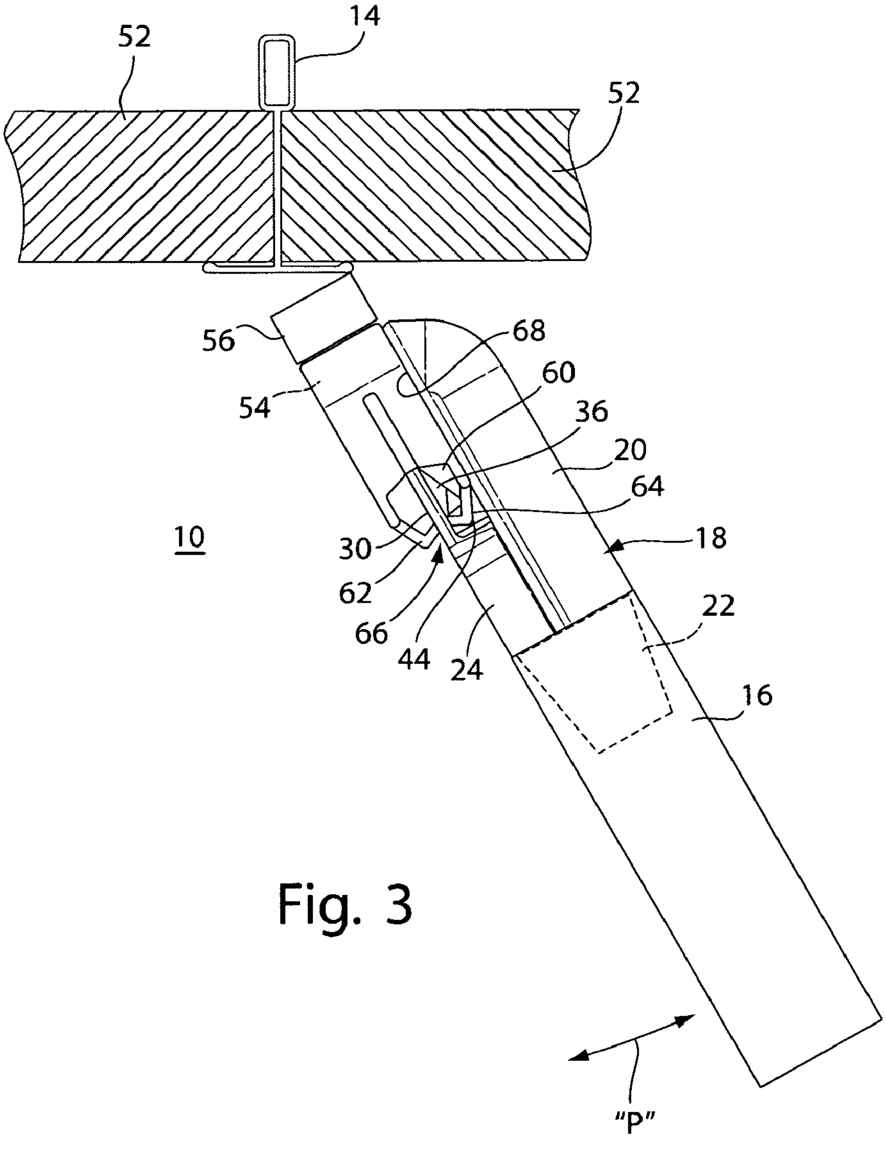
FIG. 3 is an end elevational view of an inverted t-rail and a sign holding extrusion being pivotally removed therefrom by an elongated pole and extrusion tool engaged therewith.
Figure 4:
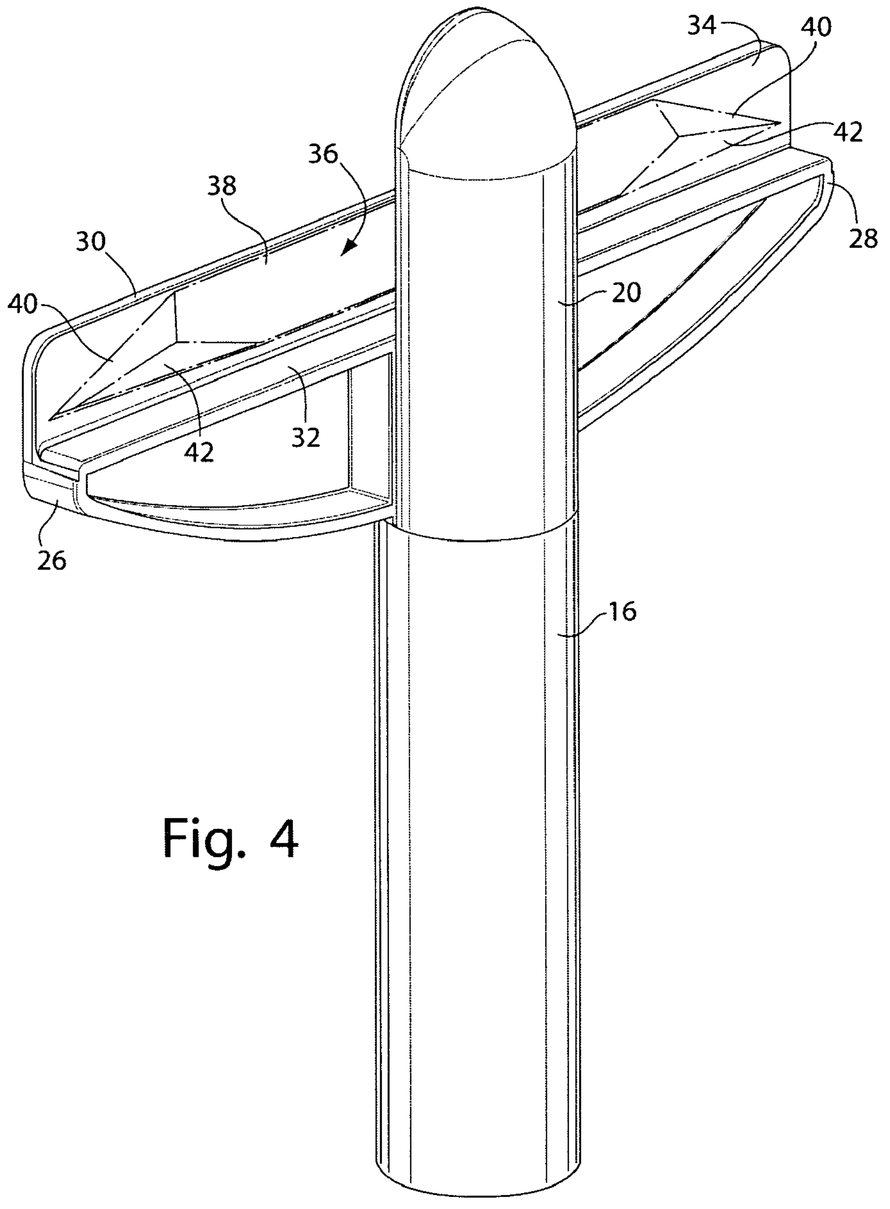
FIG. 4 is a perspective view of the extrusion tool of the present invention mated with the upper end of an elongated pole.
Figure 5:
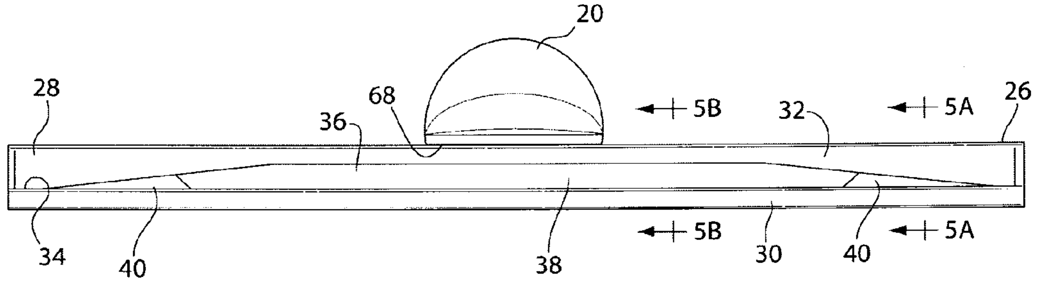
FIG. 5 is a plan view taken along the lines 5-5 of FIG. 4.
Figure 5A:
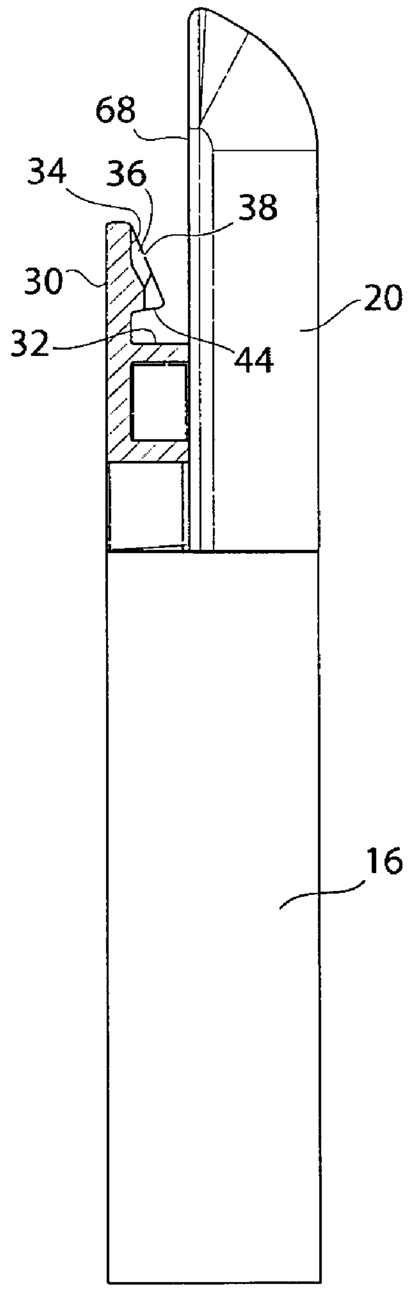
FIG. 5A is a sectional view taken along the lines A-A of FIG. 5.
Figure 5B:
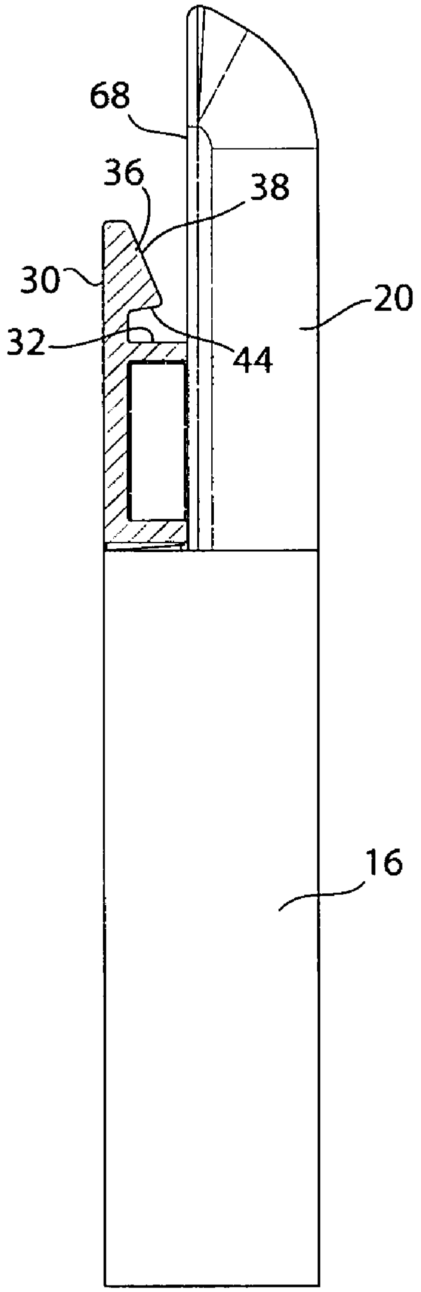
FIG. 5B is a sectional view taken along the lines B-B of FIG. 5.
Figure 6:
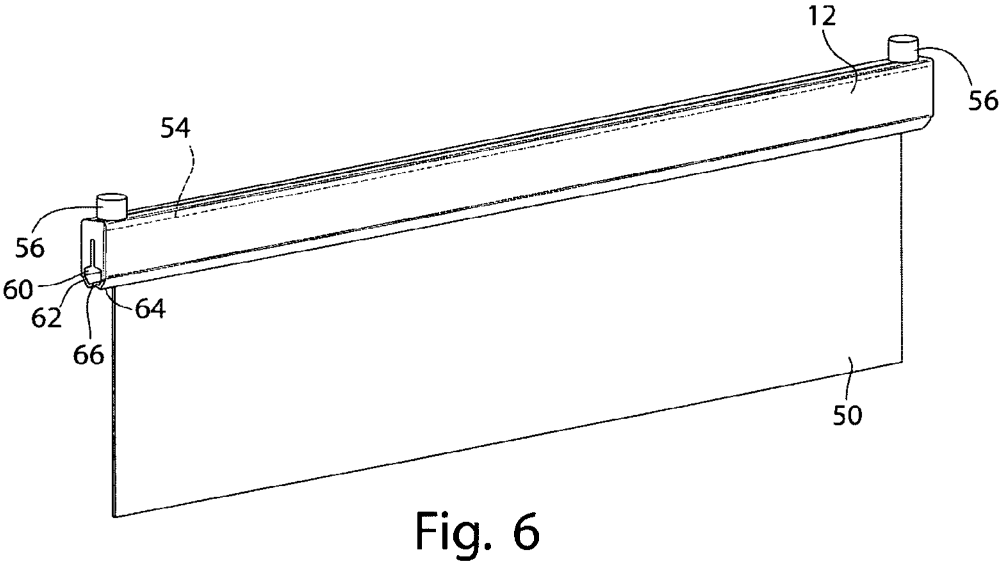
FIG. 6 is a perspective view of an elongated sign supporting extrusion with a poster supported therefrom, and a pair of magnets attached to the upper edge of that elongated extrusion.

The extrusion tool 18 comprises a cylindrical shaft 20 having a first end 22 which mates with an opening at the upper or distal end of the elongated pole 16, as represented in FIG. 3. The shaft 20 has a T-frame 24 transversely attached thereacross, as best represented in FIGS. 1, 2 and 4. The extrusion tool shaft 20 has a tip end extending beyond the edge of the T-frame 24. The T-frame 24 has a first end 26 and a second end 28, as represented in FIG. 4. The T-frame 24 has an elongated rear flange 30 which is parallel to the shaft 20, and connected to the shaft 20, by an elongated bridge member 32, as best represented in FIGS. 5, 5A and 5B.

The elongated rear flange 30 has a first side 34, which faces the shaft or bias arm 20 of the extrusion tool 18. An elongated boss 36 is unitary with and situated on the first side 34 of the elongated rear flange 30, as shown in FIGS. 4, 5, 5A and 5B. The elongated boss 36 extends from the first end 26 of the elongated rear flange 30 to the second end 28 of the elongated rear flange 30, as shown in FIGS. 4 and 5. The elongated boss 36 has an elongated angled first face 38 which tapers away from the first face 34 of the rear flange 30, and towards a thicker dimension in the direction of the elongated bridge 32, as represented in figure SA. The elongated boss 36, at each end thereof, has a generally triangularly shaped tapered first face 40 and a generally triangularly shaped tapered second face 42, each of which taper towards a point at their respective ends 26 and 28 of the elongated rear flange 30, as represented in FIG. 4. The angularity and taper of those first and second generally triangularly shaped faces 40 and 42 may be seen in section in FIG. 5A. The elongated boss 36 has a lower lip 44 extending from the outwardmost point defined by the first and second triangles 40 and 42 and constitutes a lowermost side of the elongated boss 36. The lower lip or lowermost side 44 of the elongated boss 36 is thus spaced-apart from and generally parallel to the elongated bridge 32 connecting the elongated rear flange 30 to the tool shaft 20 extending perpendicular therepast, as shown in FIGS. 5A and 5B.

Such a sign holding extrusion attachment tool 10 is to be utilized to raise and attach (and also later remove) a sign supporting extrusion 12 to an inverted elongated T-rail 14 supporting a ceiling 52, as represented in FIG. 3. The sign supporting extrusion 12, has an elongated upper channel 54 therein, as represented in FIG. 3 in which one or more magnets 56 are longitudinally adjustably arranged, as represented in FIGS. 1, 2, 3 and 6. The sign supporting extrusion 12 has a lowermost edge portion with a central channel 60 extending therethrough, as represented in FIG. 3.

The central channel 60 is defined by a pair of opposed J-shaped flanges 62 and 64 which between them define a lower gap 66 shown in FIGS. 1 and 3, which opens to the central channel 60. To hoist and attach a sign supporting extrusion 12 onto an inverted T-rail 14 in a ceiling structure, the elongated rear flange 30 may preferably be pressed perpendicularly (orthogonally) into the gap 66 between the opposed J-shaped flanges 62 and 64 along the bottom edge of the elongated extrusion 12, as shown by arrow “Z” in FIG. 1, or possibly slid from an open end thereof. The elongated lowermost face 44 on the elongated boss 36 is in abutting engagement with one of the opposed J-shaped flanges 64, as shown in FIG. 3. The shaft (bias arm) 20 on the extrusion tool 18 has an extrusion engaging face 68 which is flat, and parallel to the elongated rear flange 30, as shown in FIGS. 3, 5, 5A and 5B. A portion of the elongated sign supporting extrusion 12 is supportively disposed between the elongated rear flange 30 and the flat face 68 of the shaft 20 on the extrusion tool 18, as best shown in FIG. 3. That extrusion tool 18 may thus be pressably snapped into supportive engagement of the sign supporting extrusion 12 when it is desired to lift that extrusion 12 and its associated magnets 56 up into magnetic contact with the inverted T-rail 14, as represented in FIG. 1.

The extrusion tool 18 may also, in one embodiment, be slid on/off of the end at one opening thereof when it is desired to attach/remove that extension tool 18 from a now magnetically attached elongated extrusion 12.

When it comes time to remove the extrusion tool 18 from the elongated extrusion 12 and any associated sign 50 supported therewith, the extrusion tool 18 having already been orthogonally pushed into the gap 66, between the opposed J-shaped flanges 62 and 64 thereof, is then pivoted in a plane which is parallel to the elongated rear flange 30 of the extrusion tool 18, as represented by the arrow “S” as shown in FIG. 2. The angled triangularly shaped second face 42 then wedgingly cams itself out of the gap 66 and wedgingly permits the elongated boss 36 to be pivotably pulled outwardly by a camming action of that boss 36, thus expanding the gap 66 between the opposed J-shaped flanges 62 and 64, permitting that boss 36 and that elongated rear flange 30 (and hence the tool 18) to slip out from between that aforementioned gap 66 between the J-shaped flanges 62 and 64. Each distal edge of those opposed J-shaped flanges 62 and 64 are now removed from the pinching of the elongated rear flange 30 at its narrow portion between the boss 36 and the elongated bridge 32, such pinching being represented in FIG. 3.

When it is desired to fully remove that elongated sign supporting extrusion 12 itself from a ceiling support, such as for example, an inverted T rail 14, the attachment tool assembly 10, that is, the elongated pole 16 and extrusion tool 18 thereattached, are attached to the elongated extrusion 12, using shaft 20 to guide the rear flange 30 in proper orientation to be pushed in the gap 66. The attachment tool assembly 10 is pivoted in a plane perpendicular to the plane in which the elongated rear flange 30 lies, as represented by the arrow “P” in FIG. 3. The flat face 68 on the bias arm shaft 20 of the tool 18 permits a “lever action” between the elongated boss 36 and the face 68 of the shaft bias arm 20 against the side of the elongated support extrusion 12 so as to pivot the strong magnets 56 arranged in the upper channel 54 of the elongated sign supporting extrusion 12 away from the lower flange on the inverted T-rail 14, as shown in FIG. 3. That sign supporting extrusion 12 and sign 50 thereattached (shown in FIG. 6), may thus be removed and changed and re-applied as necessity requires.

Thus there has been shown a unique system for attaching and removing a sign holding extrusion from an inverted T-rail and a ceiling support arrangement. Such an extrusion tool is preferred, particularly when strong magnets are utilized which may be dimensionally narrow so as to be utilized on any variety of T-rails or magnetic attachments and alignments therewith. The tool also permits attachment and removal of a sign from the safety of the floor, without the inherent risks and dangers of ascending a ladder in order to manually change a ceiling supported sign.

The invention claimed is:

1. A sign hanging tool assembly for the attachment of a sign holding extrusion to a ceiling rail in a ceiling, comprising:

an extrusion tool mountable on an end of an elongated pole, said extrusion tool comprising a T-frame and a bias arm shaft, said T frame having a rear flange for engagement with a slot on said sign holding extrusion, said bias arm shaft being spaced apart and parallel to said rear flange for locating and engaging said sign holding extrusion therebetween, the rear flange having a tapered elongated boss thereon to permit pressed orthogonal wedging entry into said sign holding extrusion, the elongated boss having a tapered surface at each end thereof, the tapered surface at each end of said elongated boss comprising a generally triangularly shaped first face and a generally triangularly shaped second face.

2. The sign hanging tool assembly as recited in claim 1, wherein said bias arm shaft has a flat face thereon which is parallel to said rear flange.

3. The sign hanging tool assembly as recited in claim 2, wherein said flat face on said bias arm shaft and said rear flange are spaced apart so as to snugly support a sign holding extrusion there-between.

4. The sign hanging tool assembly as recited in claim 1, wherein said elongated boss has an angled face sloping towards said bias arm shaft.

5. The sign hanging tool assembly as recited in claim 1, wherein said rear flange is attached to said bias arm shaft by an elongated bridge member connectively spaced therebetween.

* * * * *